United States Patent
Berner et al.

(10) Patent No.: US 9,394,480 B2
(45) Date of Patent: Jul. 19, 2016

(54) LONG DECAY PHOSPHORS

(71) Applicant: Rolex SA, Genéve (CH)

(72) Inventors: Detlef Berner, La Conversion (CN);
Hans U. Güdel, Thörishaus (CH);
Isabelle Rigot, La Balme de Sillingy (FR); Romain Girod, Annemasse (FR);
Christoph Kenzelmann, Zeneggen (CH)

(73) Assignee: Rolex SA, Genève (CH)

( * ) Notice: Subject to any disclaimer, the term of this patent is extended or adjusted under 35 U.S.C. 154(b) by 108 days.

(21) Appl. No.: 13/759,104

(22) Filed: Feb. 5, 2013

(65) Prior Publication Data

US 2013/0207040 A1    Aug. 15, 2013

(30) Foreign Application Priority Data

Feb. 10, 2012  (EP) ..................... 12154815

(51) Int. Cl.
*C09K 11/77*    (2006.01)
(52) U.S. Cl.
CPC .................. *C09K 11/7792* (2013.01)
(58) Field of Classification Search
CPC ........... C09K 11/7731; C09K 11/7733; C09K 11/7734; C09K 11/7738; C09K 11/7774; C09K 11/7792; H01L 33/502
USPC ....... 252/301.4 F, 301.6 F, 301.4 R; 313/467, 313/468, 486, 503
See application file for complete search history.

(56) References Cited

U.S. PATENT DOCUMENTS

2004/0135122 A1*  7/2004  Hyland, Jr. et al. ..... 252/301.4 R
2009/0057612 A1*  3/2009  Hosoba ................ C09K 11/574 252/301.5
2009/0243467 A1* 10/2009  Shimizu ............. C09K 11/7734 313/503

FOREIGN PATENT DOCUMENTS

EP       2141215 A1    1/2010

OTHER PUBLICATIONS

Luitel et al., "Preparation and characteristics of Eu and Dy doped Sr4Al14O25 Phosphor", 2008, Materials Science Forum, vol. 569, pp. 249-252.*

Nag et al., "The mechanism of long phosphorescence of SrAl2-xBxO4 (0<x<0.2) and Sr4Al14-xBxO25 (0.1<x<0.4) co-doped with Eu2+ and Dy3+", 2004, Materials Research Bulletin, vol. 39, pp. 331-342.*

Chang et al., "Photoluminescence of 4SrO—7Al2O3 ceramics sintered with the aid of B2O3", 2004, Ceramics International, 30, pp. 285-290.*

Yuan et al., "Effect of composition on the luminescent properties of Sr4Al14O25:Eu2+, Dy3+ phosphors," Journal of Alloys and Compounds 377 (2004) pp. 268-271.

Suriyamurthy et al., "Effects of non-stoichiometry and subsitution on photoluminescence and afterglow luminescence of Sr4Al14O25:Eu2+, Dy3+ phosphor," Journal of Luminescence 128 (2008) pp. 1809-1814.

Nag et al., "The mechanism of long phosphorescence of SrAl2-xBxO4 (0<x<0.2) and Sr4Al14-xBxO25 (0.1<x<0.4) co-doped with Eu2+ and Dy3+," Materials Research Bulletin 39 (2004) pp. 331-342.

Nag et al., "Role of B2O3 on the phase stability and long phosphorescence of SrAl2O4:Eu, Dy," Journal of Alloys and Compounds 354 (2003) pp. 221-231.

Lin et al., "Anomalous luminescence in Sr4Al14O25:Eu, Dy phosphors," Applied Physics Letters, vol. 81, No. 6, Aug. 5, 2002, pp. 996-998.

* cited by examiner

*Primary Examiner* — Matthew E Hoban
*Assistant Examiner* — Lynne Edmondson
(74) *Attorney, Agent, or Firm* — Rankin, Hill & Clark LLP (57) ABSTRACT

The present invention relates to long decay phosphors comprising rare earth activated strontium aluminates and methods for producing them. The phosphors comprise a matrix of the formula $Sr_4Al_{14}O_{25}$ comprising europium as an activator and a further rare earth element as a co-activator, wherein the molar ratio of Al/Sr in the starting materials is in the range of 3.1 to less than 3.5 and the ratio of Eu/Sr is in the range of 0.0015 to 0.01. The process for the preparation of a phosphor comprises the steps of milling the starting materials for the synthesis of the phosphor, the starting materials comprising a boron compound selected from boric acid, boric oxide or a borate salt in an amount such that the B/Sr molar ratio is between 0.1 and to 0.3, treating the milled composition with heat, grinding the block material which is obtained through the heat treatment, ball-milling the crushed material, sieving the material, and washing the material with an aqueous solution.

10 Claims, 3 Drawing Sheets

LONG DECAY PHOSPHORS

INTRODUCTION

The present invention relates to long decay phosphors comprising rare earth activated strontium aluminates and methods for producing them.

STATE OF THE ART

Strontium aluminates with rare-earth (RE) dopants have been used as persistent phosphorescent materials in watch applications since the 1990s and have replaced the previous tritium+phosphor combination. Two phases have shown suitable performances for this application: the $Eu^{2+}/Dy^{3+}$ doped $SrAl_2O_4$ phase which emits with a maximum around 520 nm (green) and the less frequently used $Eu^{2+}/Dy^{3+}$ doped $Sr_4Al_{14}O_{25}$ phase which emits with a maximum around 490 nm (blue). Although the green-emitting phase is most widely used, the blue-emitting material shows superior properties in terms of persistence and perceived intensity in the dark.

To evaluate the performance of a long-persistent phosphor material, one takes principally into account the emitted intensity after a given time in the dark for a fully charged material, eg., after 200 or 800 minutes. A number of parameters influence the emitted intensity, among them the ratio of the different strontium aluminate phases present in the final product, which is related to the elemental composition of the starting material (e.g., Al/Sr molar ratio, rare earths to Sr molar ratios and the use of B as a flux in the synthesis). Besides these "intrinsic" characteristics, the shape and size distribution of the powder particles, as well as the type and amount of binder and the final thickness of the phosphor layer also influence the emitted intensity.

Furthermore, while the emitted intensity is crucial for selecting a material, at the same time the perceived day colour of the material under ambient light is very important for aesthetic considerations. The phase-pure $Eu^{2+}/Dy^{3+}$ doped $Sr_4Al_{14}O_{25}$ phosphor has a distinctive yellow colour that is often aesthetically inappropriate. It is therefore common to add colouring agents to modify the colour to tone down the yellow tint. Adding such diluting materials, which are not persistent phosphors, decreases inevitably the phosphorescence intensity of the product.

An abundant literature on phosphorescent rare earth doped $SrAl_2O_4$ and $Sr_4Al_{14}O_{25}$ compounds is available. In most documents the compounds are characterized by the concentrations of elements in the starting materials, and not in the final product. However, the chemical composition of the starting materials determines the chemical composition of the end products, as the ratio of the metal ions unambiguously determines the oxygen content and thus the composition of the end product. Differences between starting material and end product may however appear if additional treatments are performed (such as washing, which may selectively remove some soluble phases, thus altering the analytical metal ratio).

EP 0 622 440 A2 appears to be the first patent application related to $MAl_2O_4$ based persistent phosphors (where M stands for divalent alkaline earth ions). There are earlier documents for such materials, but for lamp and display phosphor applications. The main teaching is that the use of two rare earth dopants (eg., Dy in addition to Eu) significantly increases the persistence. Materials with a fixed stoichiometric ratio Al/Sr=2.0 in the starting material are described in the document.

EP 0 710 709 A1 covers the range of compositions $M_{(1-x)}Al_2O_{(4-x)}$ for a large range of x. The addition of boric acid as a flux for the synthesis is mentioned, as well as doping with $Eu^{2+}$ and a broad range of other ions, including $Dy^{3+}$. The general composition $M_{(1-x)}Al_2O_{(4-x)}$ covers both $SrAl_2O_4$ (x=0) and $Sr_4Al_{14}O_{25}$ (x=0.429) materials. However, all the data (X-ray, spectra) and examples given are for $SrAl_2O_4$ based phosphors.

The U.S. Pat. No. 5,376,303 A covers the range of compositions $MO.a(Al_{(1-b)}B_b)_2O_3$:cR. In this formula M stands for divalent alkaline earth ions, R for rare earth ions. In contrast to the above documents EP 0 622 440 A2 and EP 0 710 709 A1, the B content is explicitly incorporated into the formula. The general composition covers $SrAl_2O_4$ based materials, and examples are identified with $SrAl_2O_4$ and $SrAl_4O_7$ phosphors. Example 3 discloses specifically a strontium aluminate doped with Eu and Dy, with an Al/Sr ratio for the starting material of ca. 4 (which would correspond to a $SrAl_4O_7$ material). The document covers a large range of compositions. Only very few points in this enormous parameter space lead to high quality persistent phosphors. No material with the crystallographic $Sr_4Al_{14}O_{25}$ phase is identified. Furthermore, the decay of the emission after several hours is not mentioned, which means that there is no indication on the performance of the different materials.

The Japanese patent application JP 8-073845 A covers compositions that are similar to the ones disclosed in U.S. Pat. No. 5,376,303 A. Example 14 mentions specifically a $Sr_4Al_{14}O_{25}$ material, with Al/Sr=3.5, B/Sr=0.184, Eu/Sr=0.032 and Dy/Sr=0.016 (values converted from the formula indicated in the document). However, the decay of the emission after several hours is not disclosed, which means that there is no indication on the performance of the different materials.

The further Japanese patent document JP 09-208948 focuses on $Sr_4Al_{14}O_{25}$ based phosphors. This document also covers a huge range of compositions. However, it is probable that only very few points in this enormous parameter space lead to high quality persistent phosphors, and the figure included in the abstract indicates that the $Sr_4Al_{14}O_{25}$ material is markedly inferior in performance to a $SrAl_2O_4$ material.

A recent PhD thesis (Luitel H. N., Preparation and Properties of Long Persistent $Sr_4Al_{14}O_{25}$ Phosphors Activated by Rare Earth Metal Ions, Saga University, March 2010) provides an in-depth study of $Sr_4Al_{14}O_{25}$ based materials, which clearly shows that Al/Sr ratios over 3.5 are preferable in order to obtain good performances. An Al/Sr range of 3.4 to 4 has been explored, with 3.7 yielding the best results: the performances decrease for a lower Al/Sr ratio, indicating that Al/Sr ratios below 3.5 lead to less performant materials. The typical Eu and Dy concentrations are quite high, up to 12 at % (4 at % Eu and 8 at % Dy for the best samples). It has been noted that the optimal B concentration is B/Sr=0.1, and that increasing the B content in the starting material to B/Sr=0.25 degrades the performance.

The day colour has not been considered or described in previous documents, but it has a considerable importance for watch applications and a direct impact on the performance. For most watch applications, where the phosphor is applied on a visible surface like the dial, the day colour should often be white or close to white for design and esthetical purposes. Because the usual and available $Sr_4Al_{14}O_{25}$:Eu,Dy phosphors are yellowish in colour, a whitening material has to be added to the phosphor powder, degrading thus the performance.

A commercially available material with blue emission and white day colour is available from the supplier LumiNova AG/RC Tritec AG, Teufen, Switzerland (product line Swiss SuperLuminova, C1 colour). This product is a $Sr_4Al_{14}O_{25}$ based persistent phosphor to which a whitening agent is added. The use of a whitening pigment allows to obtain a day colour that is significantly whiter than for a phase-pure $Sr_4Al_{14}O_{25}$ based persistent phosphor, but it dilutes the active material and in consequence decreases significantly the phosphorescence intensity.

As an example of the effect of the pigment on the performances, Zeller et al. showed that the performance decreases by 15%, or even by 70%, between a phase-pure $SrAl_2O_4$-based phosphor (C3 colour according to IS03157) and a coloured "white 204" or "C1-white" (IS03157) phosphor [A. Zeller and B. Walfort, "High performance Swiss Super-LumiNova® pigment—Full night legibility for your watch", 14th International Chronometry Congress, 2010].

OBJECT OF THE INVENTION

In view of the phosphors which are available on the market, it is the intention of the present invention to provide phosphors with improved properties.

It is the object of the present invention to obtain a phosphor with excellent phosphorescence performance, as well as an appropriate day colour, so that the addition of a whitening pigment is not needed.

It is a further object of the present invention to provide a process for the preparation of phosphors with improved properties.

DESCRIPTION

The present invention relates to novel phosphors which display a phosphorescent effect for a long time and which have an essentially white day colour.

The compositions of the invention have been obtained by varying and optimizing the element ratios, using the phosphorescence intensity and the day colour as the criterion.

The phosphors according to the present invention are rare-earth doped $Sr_4Al_{14}O_{25}$ based phosphors. In these phosphors the element europium is acting as a sensitizer as well as a first activator, whereas a second rare-earth element is acting as a co-activator.

The ratio Al/Sr in the phosphors according to the present invention is in the range of 3.1 to 3.5, not including the value of 3.5. This ratio is the molar ratio calculated on the basis of the starting material composition. A preferred range of the ratio of Al/Sr is the range of 3.2 to 3.4 and the most preferred range is a range of 3.2 to 3.35. The most promising properties have been achieved with a ratio Al/Sr of approximately 3.3.

The ratio of Al/Sr in the range of the present invention is achieved through the presence of boron during the preparation of the phosphor in a high amount. Surprisingly, a higher amount of boron in the starting material, along with a lower ratio of Al/Sr, allows to obtain phosphors with enhanced properties. A boron compound is regularly added to the starting materials as a flux in the reaction. In the state of the art the amount of borate is usually chosen in the range of 1 to 10% relative to Sr (meaning a molar ratio B/Sr between 0.01 and 0.1). In the process of the present invention, however, the amount of a boron compound in the process is such that the B/Sr ratio in the starting materials is in the range of 0.1 to 0.3. As a suitable boron compound boric acid is regularly used, but other boron compounds such as for instance boric oxide or an alkaline earth borate may be used.

This ratio B/Sr is the molar ratio calculated on the basis of the starting material composition. A ratio of B/Sr in the high range of 0.25 gives good materials. It was observed that the reaction was incomplete for B/Sr=0.05 and B/Sr=0.1, meaning that the material was not phase-pure. A preferred range of the ratio of B/Sr is the range of 0.15 to 0.25 and the most preferred range is a range of 0.15 to 0.2. A particularly good effect has been obtained for B/Sr=0.175. All these values are provided as the molar ratio calculated on the basis of the starting material composition.

As will be described hereafter in connection with the process of the invention, the preparation of the phosphors may include a washing step. The phosphor which is obtained at the end of the preparation contains a crystalline phase as well as an amorphous phase. The crystalline phase takes approximately 90% by mass of the final product and consists of the doped strontium aluminate phase. The amorphous phase which is present in a minor amount is essentially dissolved in the washing step. It has been observed by the present inventors that the washing step is particularly favourable when a high amount of boron is present, such as in a ratio of B/Sr of 0.15 to 0.25.

The presence of europium as the sensitizer and activator is required in order to achieve the wanted persistent phosphorescence. It has been noted by the inventors that the ratio of Eu/Sr should be preferably in the range of 0.0015 to 0.01 in order to achieve both suitable luminescence performance and day colour. Again, this ratio Eu/Sr is the molar ratio calculated on the basis of the starting material composition. A preferred range of the ratio Eu/Sr is between 0.0025 and 0.0075 and the most favourable properties have been observed in the range of 0.004 to 0.006, particularly with a ratio Eu/Sr of approximately 0.005. The range of the Eu/Sr ratio according to the present invention is particularly suitable, as a high intensity of the emitted light is observed, while at the same time any unwanted yellow colouring of the phosphor can be avoided.

Besides europium as the activator a co-activator shall be present. The co-activator may be chosen from the rare earth metals such as lanthanum, cerium, praseodymium, neodymium, promethium, samarium, gadolinium, terbium, dysprosium, holmium, erbium, thulium, ytterbium and lutetium. From this group of co-activators, the co-activator dysprosium leads to the best results. Accordingly the preferred co-activator under the present circumstances is dysprosium.

The amount of the co-activator, according to the preferred embodiment the amount of dysprosium, shall be in a range such that the Dy/Sr ratio is between 0.005 and 0.02. The preferred range of the ratio is between 0.0075 and 0.015 and the most preferred range is between 0.008 and 0.012. This ratio is the molar ratio calculated on the basis of the starting material composition.

Regarding the day colour, for a phosphor of the wanted quality, it is the intention to obtain absolute values for $a^*$ and $b^*$ which are smaller than 10 and 16, preferably smaller than 8 and 12, most preferably smaller 6 and 8, respectively, with $L^*>91$ (when measured in the $L^*a^*b^*$ system, see below). Stated otherwise, and in relation to the obtained materials, it is the intention to obtain values for $a^*$ and $b^*$ which are $-10<a^*\leq 5$ and $-5\leq b^*<16$, preferably $-8<a^*\leq 0$ and $0\leq b^*<12$ and most preferably $-6<a^*\leq 0$ and $0\leq b^*<8$, with $L^*>91$.

In general, the effect of the invention can be achieved with the combinations of the ranges which are described above. This means that the molar ratios of Al/Sr can be combined with each of the ratios of B/Sr. For example, the effect of the invention is achieved when the preferred ratio for Al/Sr of 3.2 to 3.4 is combined with each of the ratios for B/Sr. Furthermore, each of these combinations can be combined with the different molar ratios of Eu/Sr. For instance, the possible combination of the Al/Sr ratio of 3.2 to 3.35 (as the most preferred range) with the B/Sr ratio of 0.15 to 0.25 (as the preferred range) can be combined with each of the ranges given for the ratio Eu/Sr, such as the range 0.0015 to 0.01, the range 0.0025 to 0.0075 and the range 0.004 to 0.006. All these combinations can be combined with each of the ranges for the ratio Dy/Sr which are disclosed above. So, the present invention provides for example a combination of Al/Sr of 3.1 to 3.5, B/Sr of 0.15 to 0.2, Eu/Sr of 0.004 to 0.006 and Dy/Sr of 0.005 to 0.02, just as well as a combination of Al/Sr of 3.2 to 3.4, B/Sr of 0.15 to 0.25, Eu/Sr of 0.0025 to 0.0075 and Dy/Sr of 0.008 to 0.012.

It has been noticed by the present inventors that the effect of the invention can be preferably achieved if the B/Sr, Al/Sr, Eu/Sr and Dy/Sr ratios in the phosphor are correlated. For higher B/Sr, smaller Al/Sr and higher Dy/Sr ratios can be used. The range of the ratios according to the invention is $3.1\leq Al/Sr<3.5$ and $0.0015\leq Eu/Sr\leq 0.01$, a preferred range is $3.2\leq Al/Sr\leq 3.4$ and $0.0025\leq Eu/Sr\leq 0.0075$, and the most preferred range is $3.2\leq Al/Sr\leq 3.35$ and $0.004\leq Eu/Sr\leq 0.006$. Taking into account the other major constituents, the range of the ratios according to the invention is $3.1\leq Al/Sr<3.5$, $0.001\leq Eu/Sr\leq 0.01$, $0.005\leq Dy/Sr\leq 0.02$ and $0.1\leq B/Sr\leq 0.3$; a preferred range is $3.2\leq Al/Sr\leq 3.4$, $0.0025\leq Eu/Sr\leq 0.0075$, $0.0075\leq Dy/Sr\leq 0.015$ and $0.15\leq B/Sr\leq 0.25$; and the most preferred range is $3.2\leq Al/Sr\leq 3.35$, $0.004\leq Eu/Sr\leq 0.006$, $0.008\leq Dy/Sr\leq 0.012$ and $0.15\leq B/Sr\leq 0.2$. At these ratios, a particularly high intensity of the emitted light is observed, while at the same time the observed day colour is perceived as sensibly white.

The most important feature to achieve a phosphor with favourable properties is the presence of europium in the above range. The presence of the co-activator, in particular the presence of dysprosium as the preferred type of co-activator leads to a significant improvement in the phosphorescence efficiency. A combination of europium and dysprosium with an amount of europium Eu/Sr of 0.005 and an amount of dysprosium Dy/Sr of 0.01 in the starting materials leads to a phosphorescence intensity which is about 40% higher than the commercially available products that are regularly used, but at an equally white colour. This is a remarkable improvement, and no prior art document discloses materials with good performance and optimized day colour, and/or with a chemical composition comparable to this best range.

A phosphor product with particularly favourable properties is a phosphor with the composition Al/Sr of 3.3, B/Sr of 0.175, Eu/Sr of 0.005 and Dy/Sr of 0.01.

The phosphors according to the present invention may contain further elements, as long as these do not decrease the performances of the phosphors. Such further elements may for instance be Ca, Ba or Ag. Preferably, the composition of the starting materials according to the present invention essentially consists of the components described above, without further intentionally added components.

It is a further aspect of the present invention to provide a process for the preparation of phosphors with excellent properties.

The process for the preparation of the phosphors of the present invention comprises a first step of providing a homogeneous mixture of the starting materials of the phosphor. The starting materials are chosen with a suitable level of purity.

According to a typical embodiment for the preparation of a phosphor of the formula $Sr_4Al_{14}O_{25}$ comprising europium as an activator and dysprosium as a co-activator, suitable amounts of strontium carbonate, alumina, europium oxide, dysprosium oxide and boric acid are combined. Instead of strontium carbonate it is also possible to use other strontium salts, including, but not limited to strontium oxide, strontium nitrate, strontium oxalate or strontium hydroxide. Also aluminum, europium and dysprosium can be provided in a different form as salts of various anions, such as for instance as a nitrate salt. Instead of boric acid it is possible to use boric oxide or a borate salt.

For the process of milling the starting materials, any suitable conventional procedure can be chosen. It is a preferred method to use a ball mill for obtaining the wanted result. The milling is usually conducted in the presence of water and it allows to reduce significantly the mean particle size.

At the end of the milling step a suspension of the powder is obtained, which is then dried. It is preferred to subject the wet material to spray-drying to obtain the wanted dry material. The inventors found that spray-drying the aqueous slurry of the starting materials is an important step in the industrial preparation of these phosphors. This procedure ensures a homogeneous distribution of all the elements within the particles before the firing process. In the step of spray-drying, several instrumental and procedural parameters have to be adjusted and optimized to obtain the best final product, as is well know by the person skilled in the art of such processes.

Thereafter the obtained dry homogeneous powdery mixture is treated with heat. The heat treatment is usually conducted at a temperature of 1100 to 1500° C. The duration of the treatment can be chosen in the range between 0.5 and 40 hours, preferably in the range of 2 to 40 hours. The environment during the heat treatment, or at least at the end of the heat treatment, is preferably a reducing environment, such as a stream of reducing gas (e.g., a nitrogen:hydrogen mixture of 95:5 (v/v) or different argon:hydrogen mixtures). A typical duration of the heat treatment is 32 hours. Such a typical duration includes the duration of the pre-heating period and the cooling period.

The heat treatment leads to a block of a material of high hardness. Before further treatment, this material must be crushed and sieved in order to obtain the material in the desired powder form with appropriate grain size distribution. Any conventional crushing and sieving equipments may be chosen for this treatment.

The powder which is obtained can be directly used as the basis material for the preparation of a light emitting layer in any product which shall contain the light emitting layer.

According to the preferred process of the invention, the powder which is obtained after the step of crushing and sieving is treated in a further step of washing with an aqueous washing solution. As this aqueous washing solution preferably a diluted acidic solution is selected. Such an acidic solution may be, for example, a diluted solution of acetic acid (at a concentration of for instance 10% by mass). The washing step is preferably conducted at an increased temperature such as a temperature in the range of 50 to 80° C., regularly a temperature of 70° C. At this level of the temperature the duration of the washing step can be limited to a range of 0.5 to 3 hours. If necessary a longer duration may be chosen, but this does not always lead to further improvement. The washed powder is recovered from the suspension by filtering.

The washing step leads to the removal of an amorphous phase from the powder preparation, as well as to the removal of very fine particles, thus leading to a different elemental composition in the washed product. The amorphous phase may take about 10% of the total mass of the powder before washing, and it is estimated that the washing step with the aqueous solution removes about 90% of the amorphous material which is present in the powder.

It is the surprising effect of the washing step that, although it removes less than 10% of the mass of the material contained in the powder, the phosphorescence performance of the final product may be improved by up to 30%, without affecting the day colour or the $Sr_4Al_{14}O_{25}$ based active phase. There is, to the knowledge of the inventors, no disclosure in the state of the art of this particular beneficial effect of the washing procedure. The washing step leads to an improvement of the performance of the phosphor which is substantially higher than can be explained on the basis of the removal of the amorphous phase alone.

The phosphors according to the present invention are suitable for any purpose in which a long-lived light emission is wanted. This can be any technical application which requires a long afterglow, such as applications which involve considerable time without ambient light. The fact that the phosphors according to the present invention provide excellent light emitting properties and possess a white colour makes them particularly suitable for applications in watches.

For use in watch applications (e.g., as appliques on a watch dial or on a watch hand), as well as for characterization (e.g., day colour, persistence), the phosphor has to be incorporated in a layer that comprises an adhesive matrix that acts as a binder. The presence of the adhesive matrix has an impact on the intensity of the phosphor so that logically its relative amount shall be optimized. The thickness of the layer is usually in the range between 100 μm and 3 mm for watch applications. A layer thickness of 150-200 μm is used in most cases.

According to a conventional procedure for the preparation of a layer comprising the phosphor in powdered form, the layer comprises typically 60 wt % of phosphor powder and 40 wt % of adhesive matrix. Typically, 1.5 g of phosphor powder is added to 1 g of an acrylic varnish and mixed. A thin layer is then formed with an applicator and dried in ambient atmosphere, first at room temperature and then at 65° C. for 6 h at least. These preparation and curing conditions may of course vary with the type of varnish that is used.

The layer thickness is regularly chosen as 160 μm. Only layers with a mean thickness of 160 μm±5 μm are used for persistence and day colour measurements.

EXAMPLES

The following methods were used for the preparation and characterisation of the phosphor compositions presented in the examples.

Figure 1:
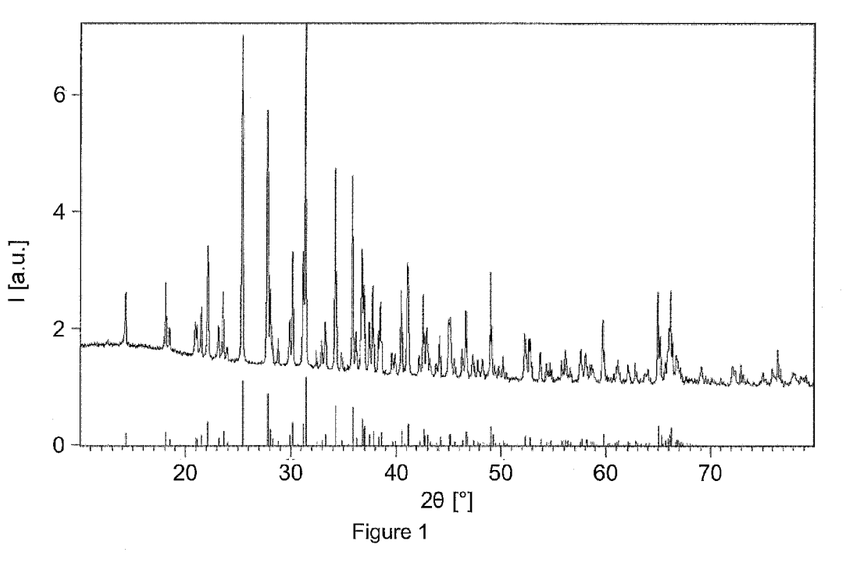
FIG. 1: X-ray diffraction diagram of a $Sr_4Al_{14}O_{25}$:Eu,Dy based phosphor sample according to the invention (top), including the reference pattern of the $Sr_4Al_{14}O_{25}$ phase from the literature (bottom).

X-Ray Diffraction:

FIG. 1 shows a typical measured X-ray diffraction pattern (sample corresponding to example 9), together with the reference diagram for the $Sr_4Al_{14}O_{25}$ phase (reference number 04-013-3940). The measurement is performed in Bragg-Brentano geometry with a Cu anode excited with 45 kV electrons. The agreement is very good, clearly demonstrating that the crystalline phase in the phosphor is essentially constituted by $Sr_4Al_{14}O_{25}$. No other strontium aluminate phase is identified. Washing had no effect on the X-ray pattern, indicating the amorphous nature of the components which are dissolved in the washing process.

Day Colour Determination

Figure 2:
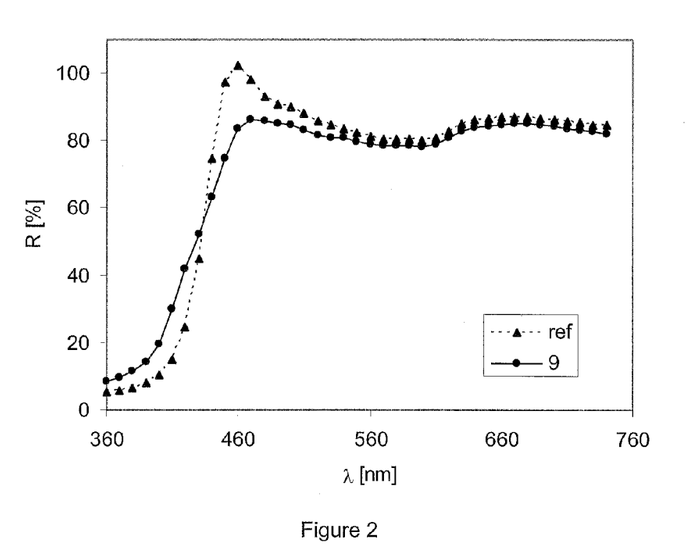
FIG. 2: Reflectance R as a function of wavelength λ, of a $Sr_4Al_{14}O_{25}$:Eu,Dy based phosphor sample according to the invention (11) compared with a commercial product (ref).

The day colour is determined by diffuse reflectance from a polymer film, in which the ball-milled and sieved material is embedded. The principal features of the reflectance spectrum are then usually captured in three numbers in the Lab colour scale (more precisely, the CIE 2000 (L*, a*, b*) colour space is used, where L* corresponds to the lightness and a* and b* to colour-opponent dimensions). The measurements are realized with a Minolta CM3610d colorimeter and D65 illuminator after charging the phosphor for 10 minutes at 400 lux. At least three different zones are measured. A typical reflectance spectrum (example 9) is compared with the spectrum of a commercial material in FIG. 2. The measured Lab values on the same film are: L*=91.9±0.02; a*=−5.6±0.05; b*=7.8±0.1 for the material, and L*=93.44; a*=−5.77; b*=3.27 for the commercial reference used here for comparison.

Particle Size Distribution

Figure 3:
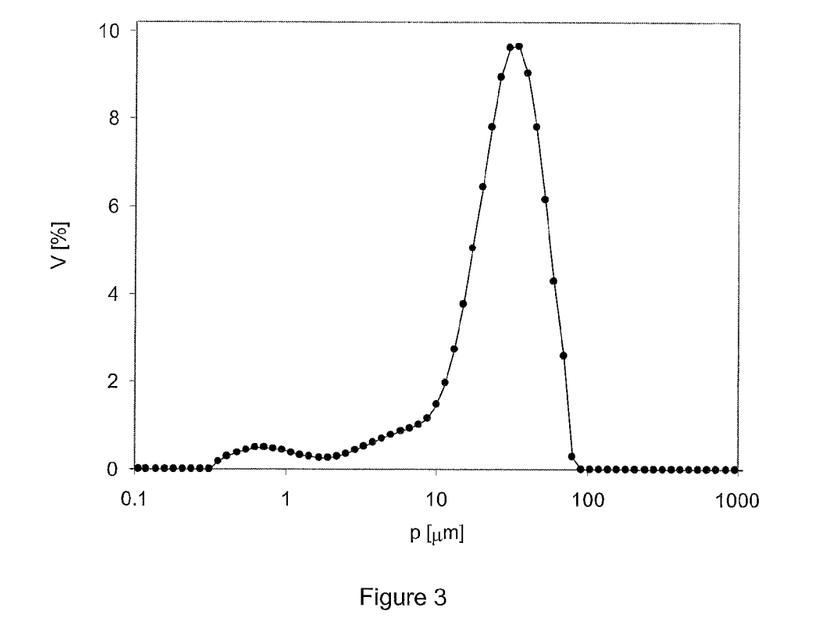
FIG. 3: Particle size distribution (volume V for a given particle size p) of a $Sr_4Al_{14}O_{25}$:Eu,Dy based phosphor sample according to the invention.

The granulometry is measured with a MASTERSIZER Hydro 2000S instrument from MALVERN Instruments. Pure water is used as a dispersant, without any tensio-active compounds. A typical particle size distribution is shown in FIG. 3 (example 11).

Because the particle size distribution has an impact on the performance, care has been taken to prepare all the materials compared below so that they all show a comparable particle size distribution (commercial products included).

Phosphorescence Spectrum

Figure 4:
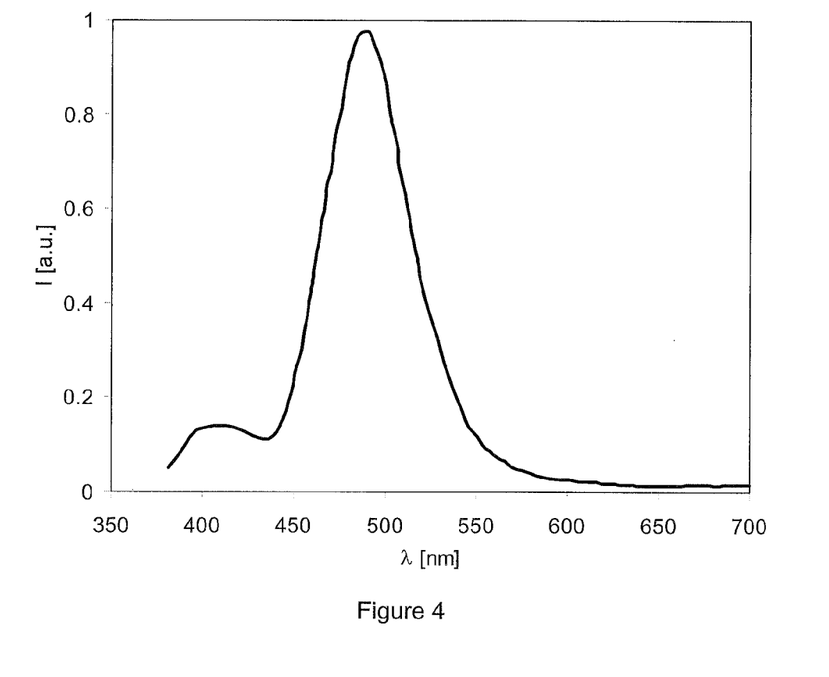
FIG. 4: Phosphorescence intensity I as a function of wavelength λ of a $Sr_4Al_{14}O_{25}$:Eu,Dy based phosphor sample according to the invention measured 20 minutes after illumination.

The phosphorescence spectra are measured on a powder with a Fluorolog (Varian) spectrometer. The phosphorescence spectrum after 20 minutes (see FIG. 4) is very similar to the fluorescence spectrum and in good agreement with the literature. There are two emission bands corresponding to the two crystallographic sites of Eu (replacing Sr) in the crystal lattice.

Phosphorescence Intensity and Decay

Figure 5:
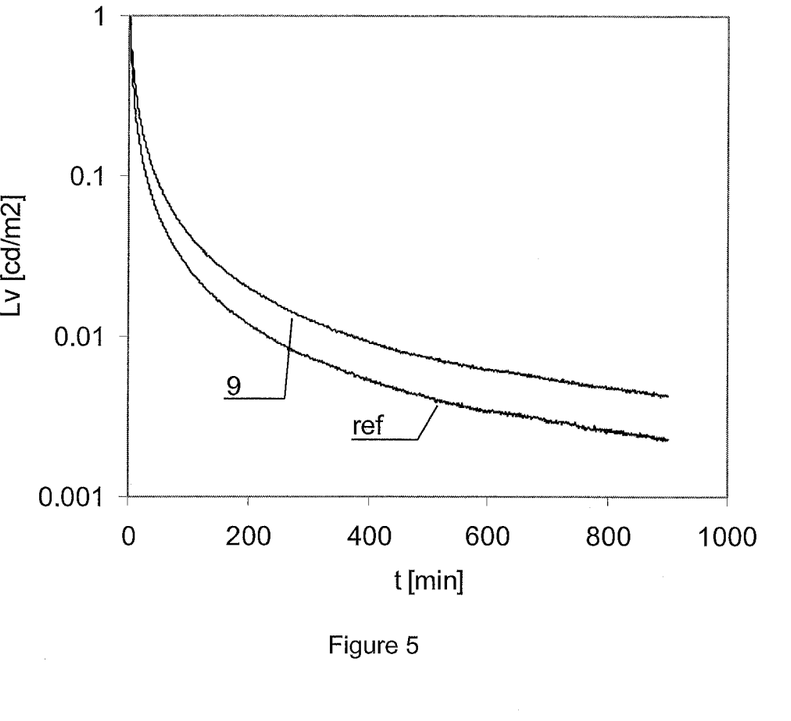
FIG. 5: Comparison of the intensity and decay of the phosphorescence Lv as a function of time t of a $Sr_4Al_{14}O_{25}$:Eu,Dy based phosphor sample according to the invention (11) and a commercial product (ref).

The intensity and decay of the phosphorescence is measured in a black chamber on up to six samples (including a reference sample) with a Pritchard PR-880 photometer. The excitation of the phosphor prior to the measurement is done in the chamber with a standard fluorescent tube. The measurement is performed in three stages: (a) the sample is kept in the dark chamber during 8 hours prior to charging; (b) the excitation is realized during 20 minutes at an excitation intensity of 400 lux according to norm ISO17514; (c) phosphorescence is measured during at least 900 minutes with an objective aperture of 3°, one of the samples being a reference sample (e.g., a commercial phosphor). The measurement is performed on 160 μm-thick layers of the phosphor embedded in the varnish. The measurement error is typically ±5% within samples measured during the same run. The measurement error can be higher between different measurement runs: a reference sample is therefore systematically included and only the materials measured during the same run are directly compared. A typical decay curve of an embodiment of the invention (example 11) is shown in FIG. 5. The reference material is included for comparison.

Chemical Composition

The chemical composition of some samples is analysed with ICP (Inductive Coupled Plasma) spectroscopy, which is more accurate than EDX (Energy Dispersive X-Ray Spectroscopy). In addition, the boron content can be determined by ICP, which is not possible by EDX.

The analysis showed that the Al/Sr ratio as well as the Eu/Sr and Dy/Sr ratios in the final product before washing matched the starting composition. The composition of the commercial reference was markedly different, due to the added colouring agent.

Example 1

The chemical starting materials (pure alpha or gamma $Al_2O_3$, $SrCO_3$, $H_3BO_3$, $Eu_2O_3$ and $Dy_2O_3$) were weighed on a precision balance (±0.1 mg) and mixed together. In the case of materials used in this example, the element ratios (as molar ratios) in the starting materials were Al/Sr=3.3, Eu/Sr=0.0015, Dy/Sr=0.01 and B/Sr=0.175.

The different starting materials (total weight of typically 180-200 g) were directly put in a 1 l milling (attrition) bowl. 1.5 kg alumina balls and 225 ml water were added to the powders before milling at 20° C. during 15 minutes at 400 rpm.

After milling, the suspension was filtered to remove the alumina balls, which were then rinsed with 375 ml water. The suspension was then spray dried.

A batch of 30 g spray dried powder was then put in a 99.7%-pure alumina crucible and heat treated at 1400° C. in a high temperature oven under reducing atmosphere (mixture of nitrogen and hydrogen in a ratio of 95:5, forming gas): heat-up time of 7 h, dwell-time at 1400° C. of 10 h, cooling time of 15 h).

After the heat treatment, the phosphor showed persistent luminescence but was a hard block of fired ceramic. This block was therefore ground, ball-milled and sieved to obtain a powder with a well-defined size distribution. A crusher with zirconia jaws and a planetary mixer, and a sieving column with a 8" sieve (mesh according to ISO 3310-1) were used, with an entry sieve of 38 μm mesh and an intermediate sieve of 25 μm mesh. Several crushing/sieving stages (typically 10 stages for 25 g of starting materials) were needed to allow all the starting material to pass through the entry sieve.

The material was not washed before characterization and preparation of the phosphor layer.

The phosphor layer was prepared according to the conventional procedure as described above. The thickness of the layer was measured with a Phynix Surfix FN comparator.

The day colour and the intensity and decay of the phosphorescence of the obtained layer were determined in the manner as described above.

The experimental data for this example is provided in Table 1a.

Examples 2 to 7

In the examples 2 to 7 further samples of phosphors were prepared in the same manner as provided in example 1. The only parameter which was varied was the amount of europium oxide, to achieve the values for the ratio Eu/Sr listed in Tables 1a and 1b.

In the reference example the commercially available product with blue emission and white day colour from the supplier LumiNova AG/RC Tritec AG, Teufen, Switzerland was used.

The particle size distribution and layer thickness were the same in all samples, in order to avoid bias in the comparison of the results.

The Tables 1a and 1b below show the influence of the Eu concentration on the phosphorescence intensity and day colour, for Al/Sr=3.3, Dy/Sr=0.01 and B/Sr=0.175 in the starting materials. The day colour shifted clearly towards yellow with increasing Eu concentration, corresponding to increasing absolute values of a* and b*. The phosphorescence intensity increased with increasing Eu concentration, and reached a maximal value between Eu/Sr ca. 0.007 and Eu/Sr ca. 0.02. The lowest Eu concentration that has been tested (Eu/Sr=0.0015) showed equivalent phosphorescence intensity after 800 minutes to the white reference material ($Sr_4Al_{14}O_{25}$ based phosphor with whitening agent).

TABLE 1a

| Name | Al/Sr | Eu/Sr | Dy/Sr | B/Sr | Luminosity after 200 min [mcd/m$^2$] | Luminosity after 800 min [mcd/m$^2$] | L* | a* | b* |
|---|---|---|---|---|---|---|---|---|---|
| Ref | — | — | — | — | 12.6 | 2.2 | 93.45 | −5.8 | 3.3 |
| 1 | 3.3 | 0.0015 | 0.01 | 0.175 | 11.8 | 2.3 | 92.4 | −0.9 | −1.3 |
| 2 | 3.3 | 0.0025 | 0.01 | 0.175 | 15.2 | 2.7 | 93.1 | −3 | 2 |
| 3 | 3.3 | 0.004 | 0.01 | 0.175 | 15.8 | 2.8 | 92.1 | −4.7 | 5.2 |
| 4 | 3.3 | 0.005 | 0.01 | 0.175 | 17.1 | 3.1 | 92.7 | −5.6 | 7 |
| 5 | 3.3 | 0.007 | 0.01 | 0.175 | 17.8 | 3.1 | 91.7 | −7.3 | 11 |

TABLE 1b

| Name | Al/Sr | Eu/Sr | Dy/Sr | B/Sr | Luminosity after 200 min [mcd/m$^2$] | Luminosity after 800 min [mcd/m$^2$] | L* | a* | b* |
|---|---|---|---|---|---|---|---|---|---|
| Ref | — | — | — | — | 12.7 | 2.4 | 93.45 | −5.8 | 3.3 |
| 6 | 3.3 | 0.01 | 0.01 | 0.175 | 18.0 | 3.3 | 91.8 | −9.5 | 15.4 |
| 7 | 3.3 | 0.02 | 0.01 | 0.175 | 17.5 | 3.1 | 91.1 | −13 | 23.7 |

The Eu/Sr=0.0025, 0.004 and 0.005 samples according to the present invention showed a significantly higher phosphorescence intensity than the commercial material (between 20 and 40% higher emitted intensity), while being at the same time similar in day colour (similar visual whiteness). Higher Eu concentrations led to more yellow films.

Examples 8 to 14

In the examples 8 to 14 further samples of phosphors were prepared in the same manner as provided in example 1. The amount of $Al_2O_3$ relative to $SrCO_3$ was varied, in order to obtain the ratios mentioned in Table 2. The persistence of the different samples was measured during several measurement runs. As six samples can be measured simultaneously, the persistence values of Table 2 were normalized with respect to the reference sample.

Samples with an Al/Sr ratio of 2.9, and 3.7, respectively, were lower in performance than the samples in the 3.1 to <3.5 range and show significant amounts (>10%) of phases other than $Sr_4Al_{14}O_{25}$. An Al/Sr ratio in the 3.1 to <3.5 range represents an optimum as it allows to obtain phosphors with high persistence and less than 10% of phases other than $Sr_4Al_{14}O_{25}$. An Al/Sr ratio in the 3.2 to 3.4 range is particularly preferred as it allows to obtain phosphors with high persistence and less than 6% of phases other than $Sr_4Al_{14}O_{25}$.

The table confirms that the Al/Sr ratio did not influence significantly the day colour in the tested concentration range, and that there seemed to be an optimum around Al/Sr=3.3 for the emitted intensity.

The preparation of example 11 was investigated for its phosphorescence decay. The result is presented in FIG. 5 in which the curve labelled with "11" corresponds to the phosphor of example 11. The curve for the reference material is indicated in the figure as "ref".

TABLE 2

| | | | | | Al/Sr content | | | | | | |
| --- | --- | --- | --- | --- | --- | --- | --- | --- | --- | --- | --- |
| Name | Al/Sr | Eu/Sr | Dy/Sr | B/Sr | $SrAl_2O_4$ concentration [mass %] | $Sr_4Al_{14}O_{25}$ concentration [mass %] | $SrAl_{12}O_{19}$ concentration [mass %] | Luminosity after 200 min [mcd/m$^2$] | Luminosity after 800 min [mcd/m$^2$] | L* | a* | b* |
| Ref | — | — | — | — | | | | 12.2 | 2.1 | 93.45 | −5.8 | 3.3 |
| 8 | 2.9 | 0.005 | 0.01 | 0.175 | 20 | 79 | 1 | 12.4 | 2.2 | 91.9 | −6.1 | 10.0 |
| 9 | 3.1 | 0.005 | 0.01 | 0.175 | 10 | 89 | 1 | 15.6 | 2.7 | 92.7 | −5.8 | 8.2 |
| 10 | 3.2 | 0.005 | 0.01 | 0.175 | 5 | 94 | 1 | 14.6 | 2.5 | 92.0 | −5.8 | 9.4 |
| 11 | 3.3 | 0.005 | 0.01 | 0.175 | 1 | 98 | 1 | 16.0 | 2.8 | 92.1 | −5.5 | 8.3 |
| 12 | 3.4 | 0.005 | 0.01 | 0.175 | | 97 | 3 | 14.6 | 2.7 | 91.7 | −5.9 | 7.4 |
| 13 | 3.5 | 0.005 | 0.01 | 0.175 | | 94 | 6 | 14.6 | 2.5 | 92.7 | −5.6 | 7.7 |
| 14 | 3.7 | 0.005 | 0.01 | 0.175 | 1 | 88 | 11 | 13.4 | 2.4 | 92.2 | −5.0 | 7.6 |

Examples 15 to 22

In the examples 15 to 22 further samples of phosphors were prepared in the same manner as provided in example 1. The amount of boric acid relative to $SrCO_3$ was varied, in order to obtain the ratios mentioned in Table 3. For samples 20 and 21 another alumina precursor was used, which shows little impact as indicated by the comparison between samples 19 and 20. The persistence of the different samples was measured during several measurement runs, as six samples can be measured simultaneously, and the persistence values were normalized with respect to the reference sample.

Samples with a B/Sr ratio of 0.05, 0.25 and 0.5 showed markedly lower phosphorescence performance than samples with a ratio of 0.1, 0.15 and 0.175. Furthermore, these samples contained significant (up to 15%) amounts of phases other than $Sr_4Al_{14}O_{25}$. The table shows that there seemed to be an optimum of the emitted intensity and the phase purity for B/Sr ratios between 0.10 and 0.25, in particular around 0.175.

TABLE 3

| | | | | | B content | | | | | | |
| --- | --- | --- | --- | --- | --- | --- | --- | --- | --- | --- | --- |
| Name | Al/Sr | Eu/Sr | Dy/Sr | B/Sr | $SrAl_2O_4$ concentration [mass %] | $Sr_4Al_{14}O_{25}$ concentration [mass %] | $SrAl_{12}O_{19}$ concentration [mass %] | Luminosity after 200 min [mcd/m$^2$] | Luminosity after 800 min [mcd/m$^2$] | L* | a* | b* |
| Ref | — | — | — | — | | | | 12.2 | 2.0 | 93.45 | −5.8 | 3.3 |
| 15 | 3.3 | 0.005 | 0.01 | 0.05 | 14 | 84 | 1 | 12.7 | 2.3 | 92.6 | −5.4 | 9.6 |
| 16 | 3.3 | 0.005 | 0.01 | 0.1 | 2 | 97 | 1 | 15.0 | 2.6 | 91.3 | −5.2 | 7.7 |
| 17 | 3.3 | 0.005 | 0.01 | 0.15 | 2 | 96 | 1 | 15.0 | 2.5 | 92.7 | −5.8 | 7.8 |
| 18 | 3.3 | 0.005 | 0.01 | 0.175 | 1 | 98 | 1 | 16.1 | 2.8 | 92.1 | −5.5 | 8.3 |
| 19 | 3.3 | 0.01 | 0.01 | 0.175 | 1 | 98 | 1 | 17.9 | 2.9 | 91.6 | −9.3 | 15.5 |
| 20 | 3.3 | 0.01 | 0.01 | 0.175 | 1 | 97 | | 16.0 | 2.7 | 91.4 | −8.6 | 15.3 |

TABLE 3-continued

| | | | | | B content | | | | | | |
|---|---|---|---|---|---|---|---|---|---|---|---|
| Name | Al/Sr | Eu/Sr | Dy/Sr | B/Sr | $SrAl_2O_4$ concentration [mass %] | $Sr_4Al_{14}O_{25}$ concentration [mass %] | $SrAl_{12}O_{19}$ concentration [mass %] | Luminosity after 200 min [mcd/m²] | Luminosity after 800 min [mcd/m²] | L* | a* | b* |
| 21 | 3.3 | 0.01 | 0.01 | 0.25 | | 93 | 7 | 12.7 | 2.2 | 92.5 | −8.5 | 15.6 |
| 22 | 3.3 | 0.01 | 0.01 | 0.5 | | 78 | 1 | 8.8 | 1.4 | 91.5 | −8.4 | 13.7 |

INDUSTRIAL APPLICABILITY

The phosphors of the present invention have been extensively studied for their light emitting properties and their day-colour. They display excellent properties which make them highly suitable in applications for watches. The process of the invention allows the preparation of phosphors of particularly high quality.

The invention claimed is:

1. A process for the preparation of a phosphor comprising a matrix of the formula $Sr_4Al_{14}O_{25}$ comprising europium and dysprosium,
the starting materials including at least an aluminum compound, a strontium compound, a boron compound, an europium compound and a dysprosium compound, wherein
the range of the molar ratio of Al/Sr is 3.1 to 3.45,
the range of the molar ratio of Eu/Sr is 0.0025 to 0.0075,
the range of the molar ratio of B/Sr is 0.15 to 0.25 and
the range of the molar ratio of Dy/Sr is 0.0075 to 0.015,
the process comprising the steps of
providing a homogeneous mixture of the starting materials for the synthesis of the phosphor by milling the starting materials,
treating the milled composition with heat,
grinding the block material which is obtained through the heat treatment,
ball-milling the ground material, and
sieving the material.

2. The process according to claim 1, wherein
the range of the molar ratio of Eu/Sr is 0.004 to 0.006,
the range of the molar ratio of B/Sr is 0.15 to 0.20 and
the range of the molar ratio of Dy/Sr is 0.008 to 0.012.

3. The process according to claim 1, wherein
the molar ratio of Al/Sr is 3.3,
the molar ratio of Eu/Sr is 0.005,
the molar ratio of B/Sr is 0.175 and
the molar ratio of Dy/Sr is 0.01.

4. The process according to claim 1, wherein the range of the molar ratio of Al/Sr is 3.2 to 3.4.

5. The process according to claim 2, wherein
the range of the molar ratio of Eu/Sr is 0.004 to 0.006,
the range of the molar ratio of B/Sr is 0.15 to 0.20 and
the range of the molar ratio of Dy/Sr is 0.008 to 0.012.

6. The process according to claim 1, wherein the range of the molar ratio of Al/Sr is 3.2 to 3.35.

7. The process according to claim 6, wherein
the range of the molar ratio of Eu/Sr is 0.004 to 0.006,
the range of the molar ratio of B/Sr is 0.15 to 0.20 and
the range of the molar ratio of Dy/Sr is 0.008 to 0.012.

8. A process for the preparation of a phosphor comprising a matrix of the formula $Sr_4Al_{14}O_{25}$ comprising europium as an activator and a further rare earth element as a co-activator,
the starting materials including at least an aluminum compound, a strontium compound, a boron compound, an europium compound and a compound of a further rare earth element,
wherein the Al/Sr molar ratio in the starting materials is in the range of 3.2 to 3.4,
the B/Sr molar ratio in the starting materials is in the range of 0.15 to 0.25,
the Eu/Sr molar ratio in the starting materials is in the range of is 0.0025 to 0.0075, and
the Dy/Sr molar ratio in the starting materials is in the range of is 0.0075 to 0.015,
the process comprising the steps of
providing a homogeneous mixture of the starting materials for the synthesis of the phosphor by milling the starting materials,
treating the milled composition with heat,
grinding the block material which is obtained through the heat treatment,
ball-milling the ground material, and
sieving the material.

9. The process according to claim 8, wherein
the range of the molar ratio of Al/Sr is 3.2 to 3.35,
the range of the molar ratio of Eu/Sr is 0.004 to 0.006,
the range of the molar ratio of B/Sr is 0.15 to 0.20 and
the range of the molar ratio of Dy/Sr is 0.008 to 0.012.

10. The process according to claim 8, wherein
the molar ratio of Al/Sr is 3.3,
the molar ratio of Eu/Sr is 0.005,
the molar ratio of B/Sr is 0.175 and
the molar ratio of Dy/Sr is 0.01.

* * * * *